United States Patent [19]
Ku

[11] Patent Number: 6,053,611
[45] Date of Patent: Apr. 25, 2000

[54] EYEGLASS FRAME COUPLING SYSTEM

[76] Inventor: Kuo-Hseng Ku, No. 201, Kuo-An Street, Tainan, Taiwan

[21] Appl. No.: 09/216,840

[22] Filed: Dec. 21, 1998

[51] Int. Cl.[7] ................. G02C 9/00; G02C 7/08
[52] U.S. Cl. ................................. 351/47; 351/57
[58] Field of Search .............. 351/47, 57, 140, 351/147, 149, 41, 44

[56] References Cited

U.S. PATENT DOCUMENTS

| | | | |
|---|---|---|---|
| 5,642,177 | 6/1997 | Nishioka | 351/47 |
| 5,877,838 | 3/1999 | Chao | 351/47 |
| 5,883,689 | 3/1999 | Chao | 351/47 |

FOREIGN PATENT DOCUMENTS

WO 90/09611  8/1990  WIPO ........................ 351/47

*Primary Examiner*—Huy Mai
*Attorney, Agent, or Firm*—Rosenberg, Klein & Lee

[57] ABSTRACT

A pair of auxiliary glasses with magnets in the present invention are provided with an upper and a lower against flanges which are backwardly protrudent on the bridge. Two magnets are respectively inserted in the upper and the lower against flanges, which are corresponding to each other. A pair of primary eyeglasses are provided with a magnet inserted in a proper position of the bridge. The bridge of the primary eyeglasses is capable of being inserted into the space between the upper and the lower against flanges of the bridge of the auxiliary glasses. Therefore, the auxiliary glasses can firmly attach to the primary eyeglasses not only by the function of the upper and the lower against flanges firmly clipping the bridge of the primary eyeglasses but also by the magnetic forces of the magnets.

4 Claims, 5 Drawing Sheets

EYEGLASS FRAME COUPLING SYSTEM

BACKGROUND OF THE INVENTION

1. Field of the Invention

This invention relates to a pair of auxiliary glasses with magnets which is capable of being coupled to a pair of primary eyeglasses. More particularly, the present invention provides a structure for the auxiliary glasses to be firmly attached to the primary eyeglasses so as to prevent the auxiliary glasses from falling apart from the primary eyeglasses while the primary eyeglasses being worn by a user.

2. Description of the Related Art

Because a pair of eyeglasses and a pair of sun-shading glasses are independent, it is necessary for a myope or a hyperope to carry a pair of near-sighted or a far-sighted eyeglasses and a pair of sun-shading glasses on the occasion of needing to wear a pair of sunglasses. It is very inconvenient to carry and change a pair of sunglasses and a pair of eyeglasses. Thus, auxiliary glasses being able to be coupled to a pair of primary eyeglasses were invented to overcome the inconvenience.

Referring to FIG. 6, a pair of conventional auxiliary glasses 20 are provided with two magnets 201 respectively pivoted in both end portions. The auxiliary glasses 20 with magnets 201 can be secured to a pair of primary eyeglasses 10, which are provided with two magnets 101 in both end portions so as to be respectively attached to by the two magnets 201 of the auxiliary glasses 20.

However, because the above-mentioned conventional auxiliary glasses 20 attach to the primary eyeglasses 10 by the front faces of the magnets 101 and 201, the auxiliary glasses 20 will easily fall apart from the primary eyeglasses 10 while a user are running, jumping or bumped against by external forces.

SUMMARY OF THE INVENTION

Therefore, an objective of the present invention is to provide a pair of auxiliary glasses with magnets which are capable of firmly attaching to a pair of primary eyeglasses so as to prevent from falling apart from the primary eyeglasses.

Accordingly, the auxiliary glasses with magnets in the present invention are provided with an upper and a lower against flanges which are backwardly protrudent on the bridge. Two magnets are respectively inserted in the upper and the lower against flanges, which are corresponding to each other. A pair of primary eyeglasses are provided with a magnet inserted in a proper position of the bridge. The bridge of the primary eyeglasses is capable of being inserted into the space between the upper and the lower against flanges of the bridge of the auxiliary glasses. Therefore, the auxiliary glasses can firmly attach to the primary eyeglasses not only by the function of the upper and the lower against flanges firmly clipping the bridge of the primary eyeglasses but also by the magnetic forces of the magnets.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
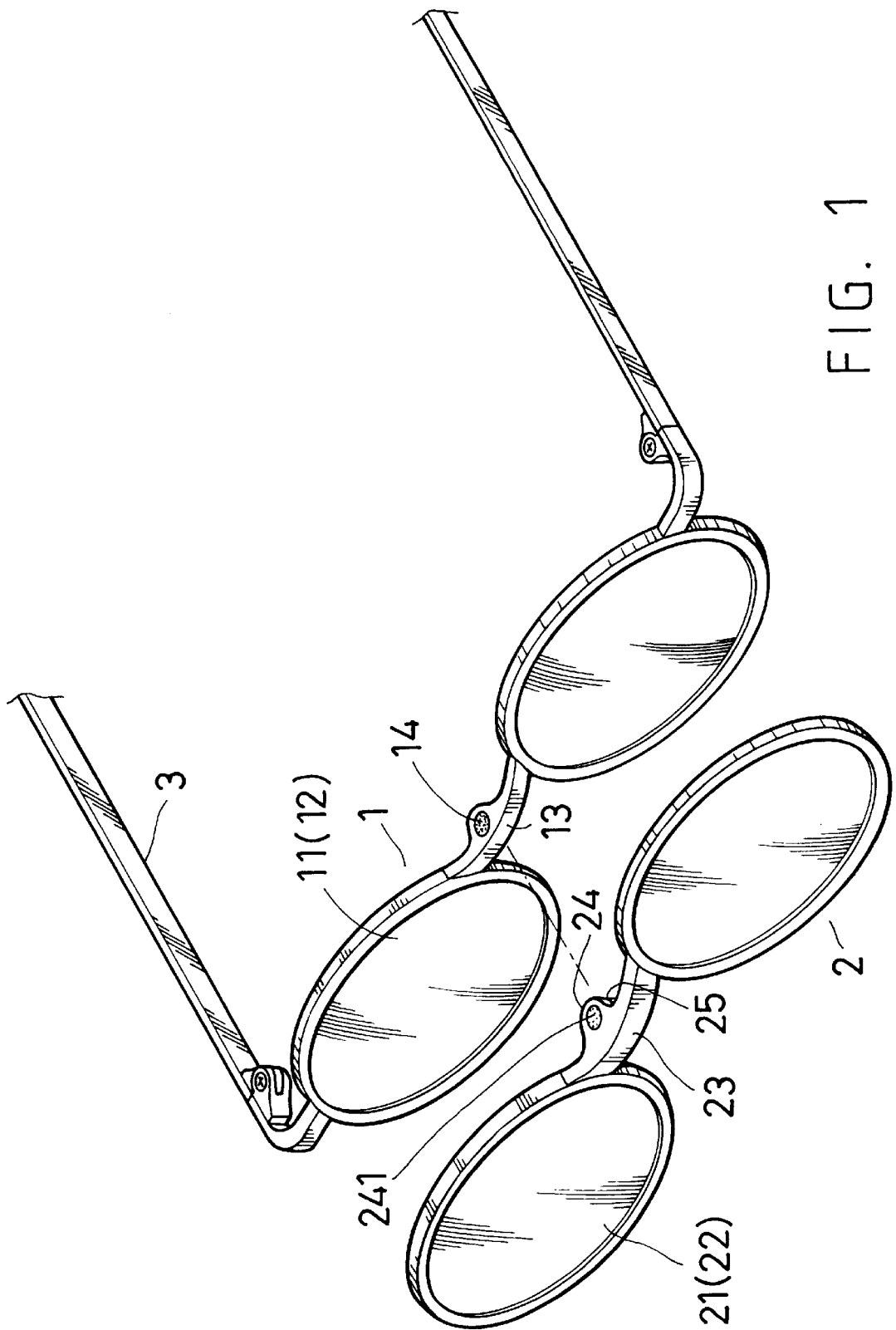
FIG. 1 is an exploded perspective view of a pair of auxiliary glasses and a pair of primary eyeglasses in the present invention.

First, referring to FIG. 1, a pair of auxiliary glasses with magnets of the present invention are provided to be secured to a pair of primary eyeglasses.

The primary eyeglasses include a metallic or plastic rim 1 with two holes 11 for optical lenses 12 to be mounted within and temples 3 being pivoted at two ends of the rim 1. A magnet 14 is inserted into a proper position of the bridge 13 which is provided to connect two holes 11.

The auxiliary glasses with magnets having a shape corresponding to that of the primary eyeglasses include a metallic or plastic rim 2 with two holes 21 for sun-shading lenses 22 to be mounted within. An upper against flange 24 and a lower against flange 25 are backwardly protrudent on the upper and lower portions of the bridge 23 and correspond to each other. The space between the upper against flange 24 and the lower against flange 25 is proper for the bridge 13 of the rim 1 of the primary eyeglasses to be inserted into. An upper magnet 241 and a lower magnet 251 are respectively inserted into the upper against flange 24 and the lower against flange 25, and the two magnets 241, 251 properly correspond to each other and to the magnet 14 in the bridge 13 of the rim 1.

Figure 2:
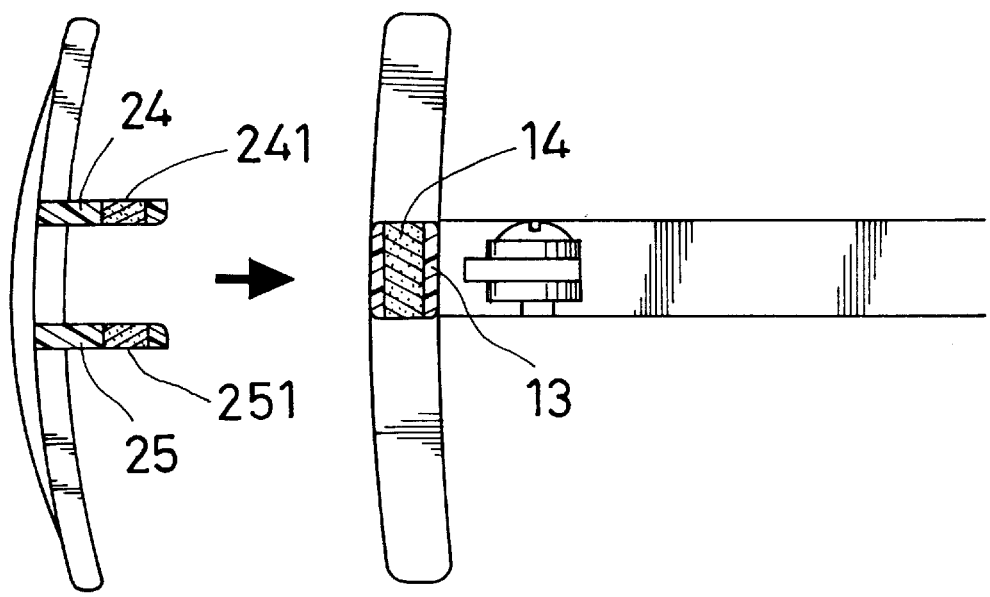
FIG. 2 is a schematic view showing the way of the auxiliary glasses with magnets being coupled to the primary eyeglasses in the present invention.
Figure 3:
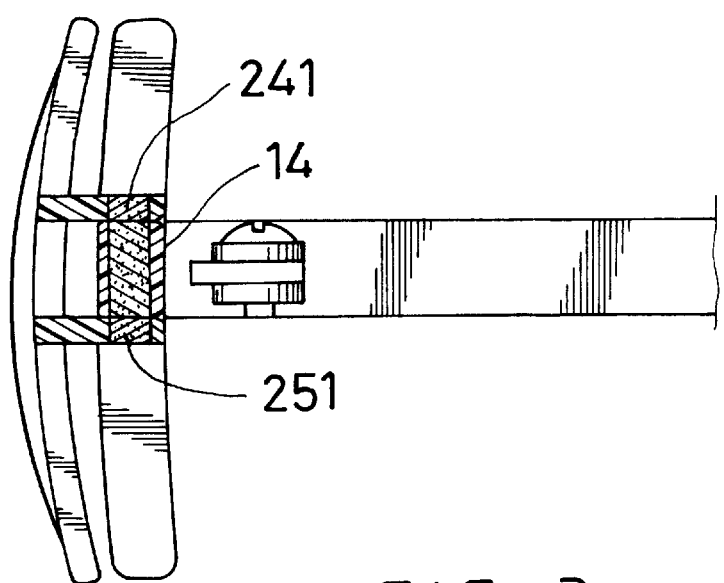
FIG. 3 is a schematic sectional view of the auxiliary glasses with magnets coupled to the primary eyeglasses in the present invention.

Referring to FIG. 2, while being used, the auxiliary glasses can be directly secured to the primary eyeglasses with the upper against flange 24 and the lower flange 25 of the bridge 23 of the auxiliary glasses clipping the bridge 13 of the primary eyeglasses, and the upper magnet 241 and the lower magnet 251 in the upper against flange 24 and the lower against flange 25 will respectively attach to the ends of the magnet 14 in the bridge 13 of the primary eyeglasses, as showing in FIG. 3. Thus, the auxiliary glasses can firmly attach to the primary eyeglasses not only by the function of the upper and the lower against flanges 24 and 25 firmly clipping the bridge 13 of the primary eyeglasses but also by the magnetic forces of the magnets 241, 251 and 14.

Figure 4:
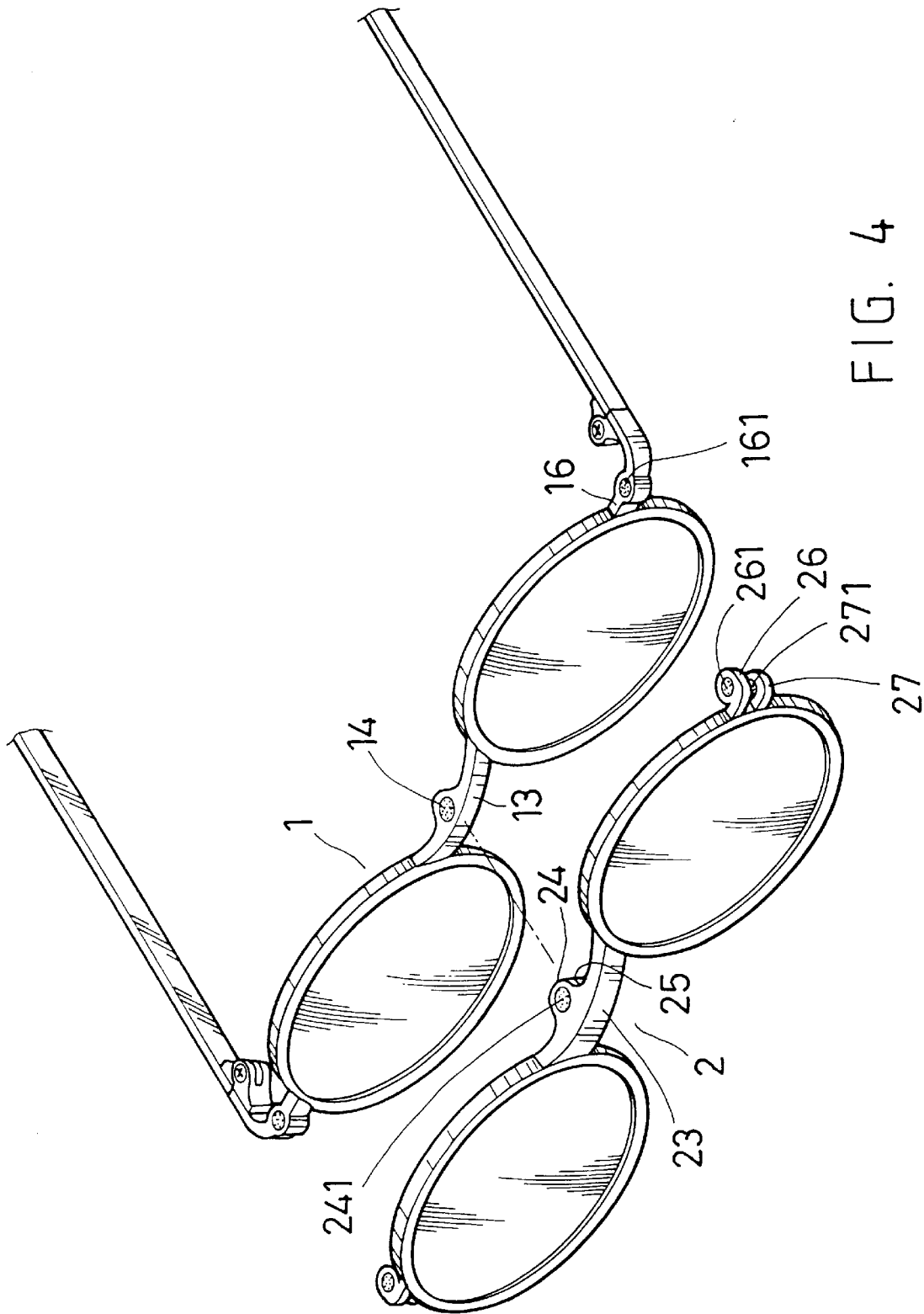
FIG. 4 is an exploded perspective view of another embodiment of the present invention.

Besides, referring to FIG. 4, magnets 161 may be additionally provided in both hinges 16 of the primary eyeglasses, and two sets of backwardly protrudent upper against flanges 26 and lower against flanges 27 may be additionally provided on both ends of the auxiliary glasses. Upper magnets 261 and lower magnets 271 are respectively inserted in the upper against flanges 26 and the lower against flanges 27. The spaces between the upper against flanges 26 and the lower against flanges 27 are respectively properly for the hinges 16 to be inserted into. Thus, the auxiliary glasses can be firmly secured to the primary eyeglasses not only by the magnetic forces of the magnets 14, 241, 251 and the clipping of the upper and lower against flanges 24, 25 in the center but also by the magnetic forces of the magnets 161, 261, 271 and the clipping of the upper and lower against flanges 26, 27 on both ends.

Figure 5:
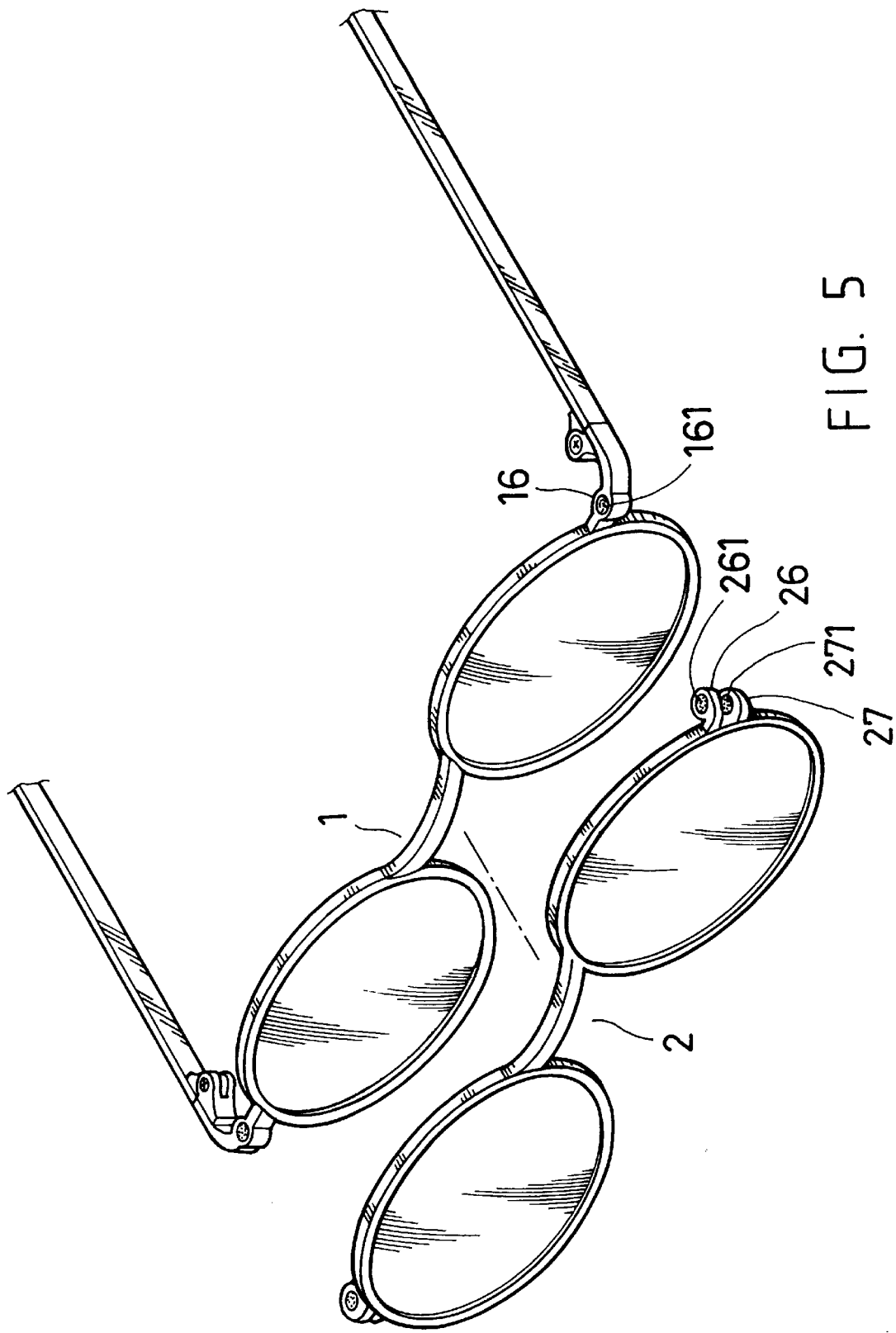
FIG. 5 is an exploded perspective view of one more embodiment of the present invention; and, FIG. 6 is an exploded perspective view of a conventional pair of auxiliary glasses with magnets and a pair of primary eyeglasses.
Figure 6:
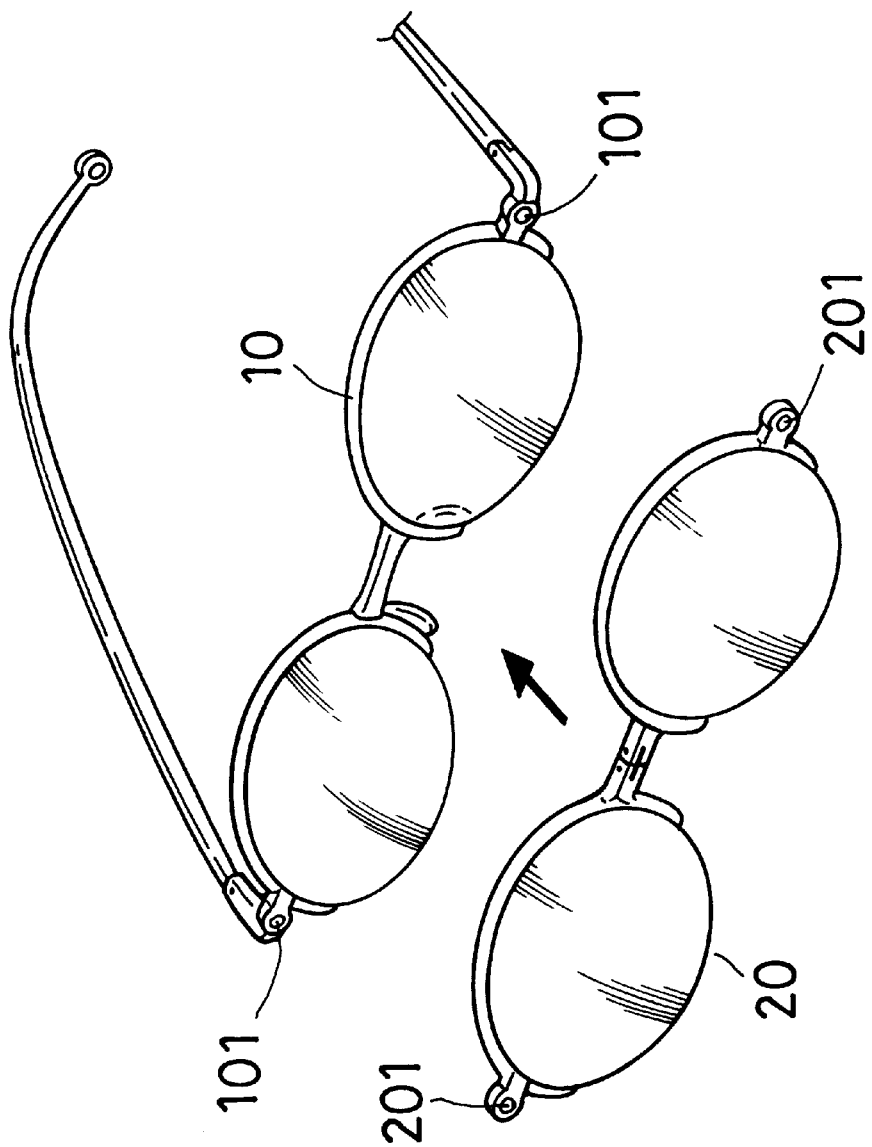

Referring to FIG. 5, the auxiliary glasses in the present invention may only be provided with two sets of backwardly protrudent upper against flanges 26 and lower against flanges 27 on both ends, and upper magnets 261 and lower magnets 271 are respectively inserted in the upper against flanges 26 and the lower against flanges 27. The primary eyeglasses in the present invention may be only provided with magnets 161 in both hinges 16. The spaces between the upper against flanges 26 and the lower against flanges 27 are respectively proper for the hinges 16 to be inserted into. Thus, the auxiliary glasses can also be firmly secured to the primary eyeglasses by the magnetic forces of the magnets 161, 261, 271 and the clipping of the upper and lower against flanges 26, 27 on both ends.

From the above description, it can be understood that the auxiliary glasses in the present invention can be firmly secured to the primary eyeglasses by the magnetic forces of the magnets and the clipping of the upper and lower against flanges in the center and/or by the magnetic forces of the magnets and the clipping of the upper and lower against flanges on both ends.

While the preferred embodiments of the invention have been described above, it will be recognized and understood that various modifications may be made therein and the appended claims are intended to cover all such modifications which may fall within the spirit and scope of the invention.

What is claimed is:

1. A system for securely coupling an auxiliary eyeglass frame to a primary eyeglass frame comprising:
   (a) at least one coupling magnet secured to a predetermined frame portion of one of the primary and auxiliary eyeglass frames, said coupling magnet passing through said predetermined frame portion of the eyeglass frame, said coupling magnet having distal first and second ends; and,
   (b) at least one clipping structure formed on the other of the primary and auxiliary eyeglass frames for releasably engaging said predetermined frame portion, said clipping structure including:
   (1) a pair of opposed flanges spaced one from the other to capture said predetermined frame portion therebetween; and,
   (2) at least first and second magnets respectively secured to said pair of opposed flanges for respective attractive magnetic coupling to both of said first and second ends of said coupling magnet;
   whereby the said predetermined frame portion of one of the primary and auxiliary eyeglass frames releasably engages said clipping structure of the other of the eyeglass frames in a magnetically reinforced manner.

2. The coupling system as recited in claim 1 wherein said predetermined frame portion is formed on a bridge of the primary eyeglass frame; and, said clipping structure is formed on a bridge of the auxiliary eyeglass frame.

3. The coupling system as recited in claim 2 further comprising at least a pair of said coupling magnets secured respectively to a pair of said predetermined frame portions each formed in the primary eyeglass frame adjacent a hinge thereof; and, at least a pair of said clipping structures each formed in opposing end portions of the auxiliary eyeglass frame for releasably engaging said pair of coupling magnets disposed adjacent the primary eyeglass frame hinges.

4. The coupling system as recited in claim 1 comprising at least a pair of said coupling magnets secured respectively to a pair of said predetermined frame portions, each of said predetermined frame portions being formed in the primary eyeglass frame adjacent a hinge thereof; and, at least a pair of said clipping structures each formed in opposing end portions of the auxiliary eyeglass frame for releasably engaging said pair of coupling magnets.

* * * * *